Patented May 8, 1923.

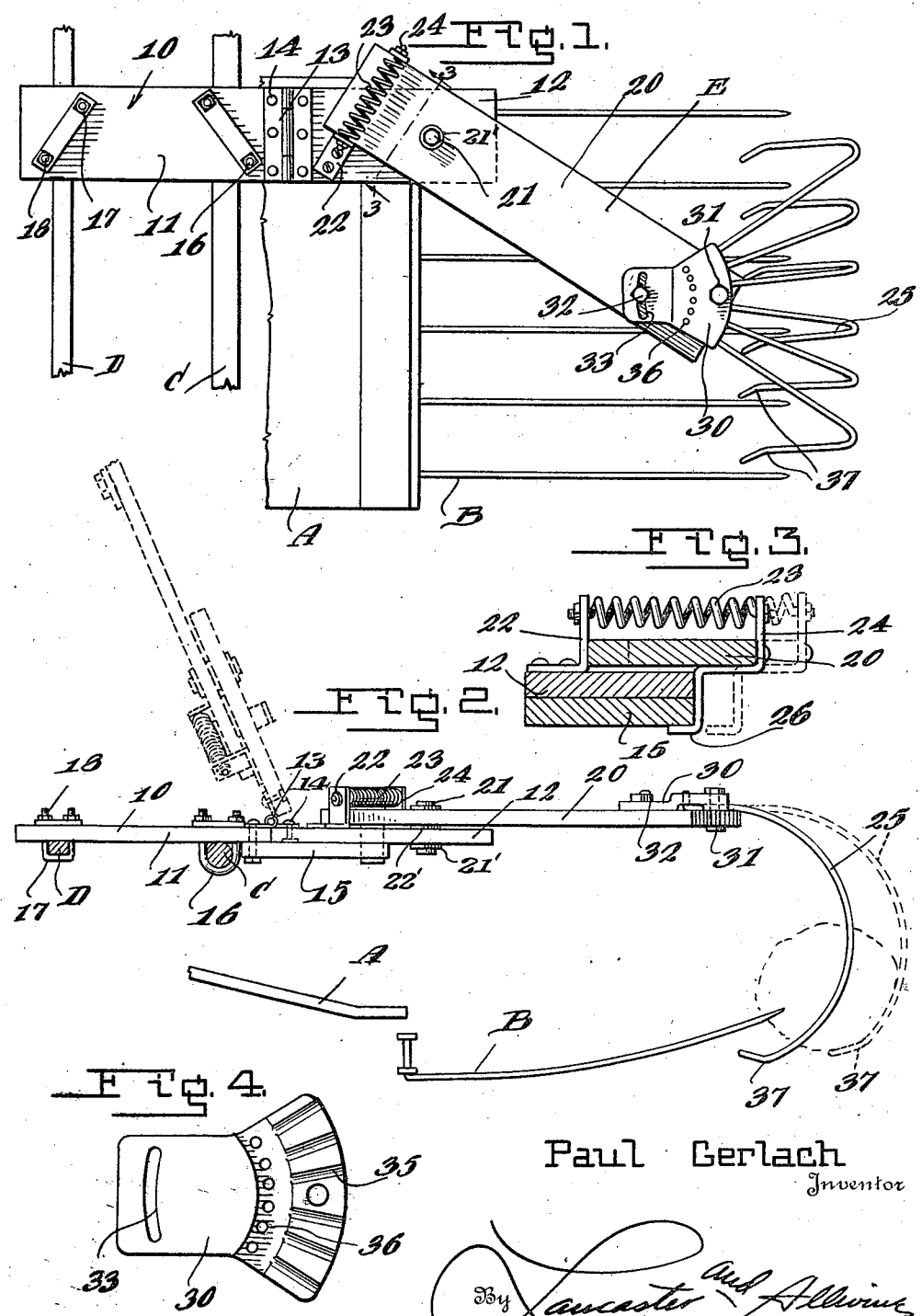

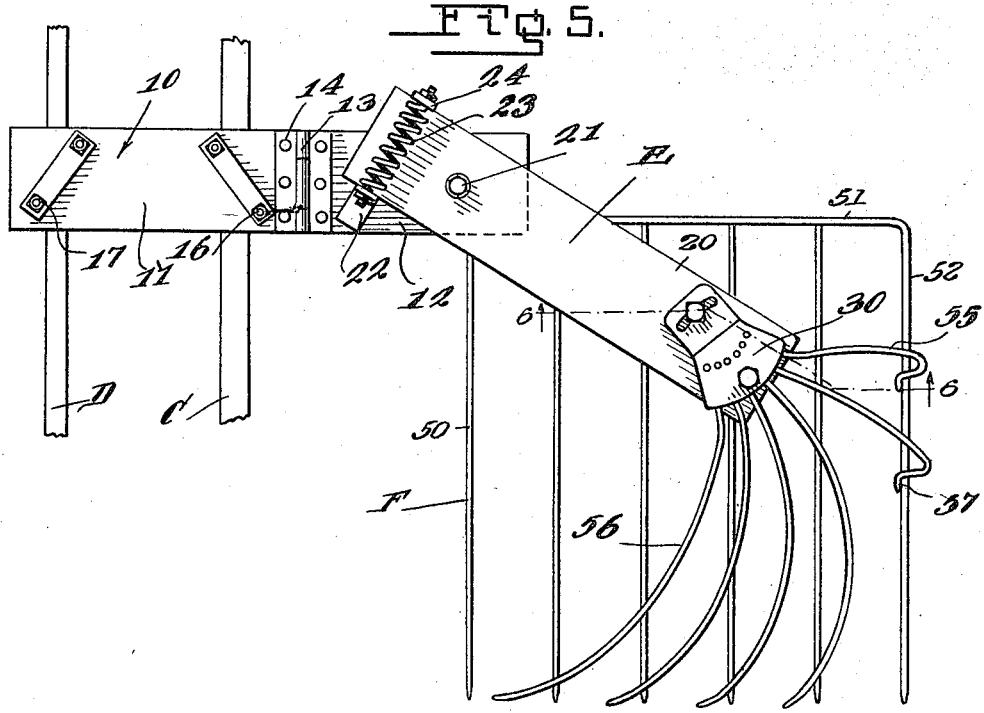
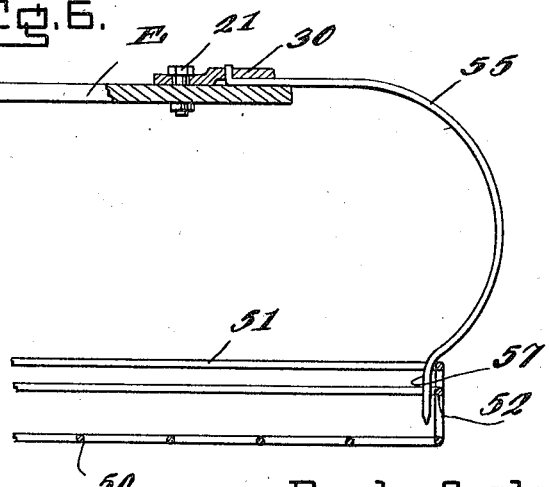

1,454,471

UNITED STATES PATENT OFFICE.

PAUL GERLACH, OF SASKATOON, SASKATCHEWAN, CANADA.

BUNDLE-CARRYING ATTACHMENT FOR GRAIN HARVESTERS.

Application filed October 27, 1920. Serial No. 420,026.

*To all whom it may concern:*

Be it known that I, PAUL GERLACH, a citizen of Canada, and a resident of Saskatoon, in the Province of Saskatchewan and Dominion of Canada, have invented certain new and useful Improvements in a Bundle-Carrying Attachment for Grain Harvesters, of which the following is a specification.

This invention relates to grain harvesters of the self binder type and more particularly to an attachment therefor to be used in connection with the ordinary bundle carrier to prevent the accidental discharge of bundles from the carrier and to enable the carrier to retain a greater number of bundles, and to assist in carrying a portion of the load, caused by the greater accumulation of bundles.

An object of the invention is to provide an attachment for grain harvesters as specified, which includes a yieldable supporting arm having a plurality of arcuate resilient bundle engaging fingers carried by the outer end of the same which curve downwardly over the outer ends of the ordinary rods of the bundle carrier of the binder, for forming an abutment at the outer end of the carrier. The fingers are so formed and so disposed that when enough pressure is brought to bear against the same they will spring outward and upward leaving room for a sheaf or bundle forced off the carrier by subsequent sheaves or bundles. The fingers have hooked ends formed thereon for catching the bundle forced off the carrier, thereby preventing the bundle from falling on the the ground.

A further object of the invention is to provide an attachment for preventing the accidental discharge of bundles from harvesters which can be readily associated, with slight changes, to all types of harvesters, the attachment being so constructed as to also effectively hold loose straw against accidental displacement, such as during the harvesting of flax and the like.

A still further object of the invention is to provide an improved attachment for harvesters of the above character which can be adjusted to various requirements, and which is durable and efficient in use, one that is simple and easy to construct and one which can be manufactured and incorporated with a harvester at a minimum cost.

With these and other objects in view, the invention consists in the novel construction, arrangement and formation of parts as will be hereinafter more specifically described, claimed and illustrated in the accompanying drawings, forming a part of this specification, in which drawings:

Figure 1 is a top plan view of the attachment showing the same applied to a portion of a binder.

Figure 2 is a side elevation of the binder attachment showing its relation to the coacting parts of the binder, and illustrating the inoperative position of the attachment in dotted lines.

Figure 3 is a detail transverse section through the attachment taken on the line 3—3 of Fig. 1 illustrating the connection of the carrier for the spring finger bundle engaging members.

Figure 4 is a bottom plan view of the finger or arcuate rod retaining plate.

Figure 5 is a top plan view of a modified type of attachment showing the same connected with a portion of a binder in which the carrier structure projects laterally therefrom.

Figure 6 is a detail fragmentary section through the modified form of the device and carrier platform of the harvester taken on the line 6—6 of Figure 5, illustrating the connection of the spring fingers therewith.

Referring more particularly to the drawings, wherein similar reference characters designate corresponding parts throughout the several views, the letter A indicates the deck of an ordinary self-binding grain harvester, from which deck the bundles of grain are deposited upon the ordinary carrier structure B. The knotter supporting casing or bar of the binder is indicated by the letter C, while D indicates the rear brace of the knotter mechanism.

The improved attachment is generally indicated by the letter E and it comprises an attaching bar 10, which is preferably formed of an inner section 11 and an outer section 12. The outer section 12 is connected to the inner section 11 by means of a hinge 13. The bolts 14 utilized for connecting the hinge 13 with the outer end of the section 11 are also utilized for attaching the rest bar 15 for the section 12 to the section 11. This rest bar 15 eliminates the strain on the hinge 13 and also cooperates with other mechanism which will be hereinafter more fully described for holding the section 12 in its operative position against accidental displacement.

The inner section 11 of the attaching bar 10 is secured to the shaft C and the brace bar D by means of U-shaped bolts 16 and 17 respectively. The upper threaded ends 18 of the bolts 16 and 17 are formed relatively long, so as to permit the raising of the section 11 to allow placing of spacing blocks between the section 11 of the bar 10 and the shaft C and brace D if so desired.

The section 12 of the attaching bar 10 has pivotally connected thereto adjacent to its outer end the finger carrying bar 20 and this bar 20 is connected to the section 12 by means of a pivot bolt 21. Suitable wear and spacing washers 21' and 22' are utilized on the pivot bolt for permitting the free swinging movement of the finger carrying bar 20 on the section 12. The bar 20 continues rearwardly of the pivot bolt 21 and it is adapted to engage an angle bracket 22 which is bolted or otherwise secured to the upper surface of the section 12. By referring to Figure 1 of the drawings it can be seen that the bar 20 extends laterally and at an angle from the attaching bar 10 and that the outer end of the same carries the bundle engaging fingers 25, which will be hereinafter more fully described. The bar 20 is normally held in engagement with the angle bracket 22 by means of a contractile coil spring 23, which has its ends secured respectively to the angle bracket 22 and to an angle bracket 24, which is carried by the bar 20. The lower end of the angle bracket 24 carries an inwardly extending foot 26 which is adapted to engage one side of the section 12 and the lower surface of the rest bar 15. The provision of the foot 26 engaging the under surface of the rest bar 15 absolutely precludes the accidental upward swinging movement of the bar 20 and consequently raising the fingers 25 and the section 12 of the bar 10, thus preventing the accidental discharge of any of the bundles caused by a too heavy load being carried.

The outer end of the bar 20 carries a casting or head 30, and this casting is pivotally connected thereto by means of a bolt 31. The casting or head 30 is held in its adjusted position with respect to the bar 20 by a bolt 32 which extends through an arcuate slot 33 formed in the rear portion of the casting 30. The forward end of the casting 30 is segmental in shape and is provided with a plurality of grooves 35 which radiate from a common center. The grooves 35 substantially terminate at their inner ends in openings 36 which extend upwardly through the casting 30.

The fingers 25 have their inner portions bent upwardly and extended into the openings 36 for securely connecting the fingers 25 to the casting 30 when this casting is securely clamped against the upper surface of the bar 20. When casting 30 is in position the fingers or rods 25 will be held against independent or relative movement. It can be seen that each of the fingers will seat in one of the grooves 35 and that they are prevented from moving out of the grooves owing to the engagement of the lower face of the casting with the upper surface of the bar 20. The fingers 25 curve outwardly and downwardly toward the carrier structure B and have their lower ends bent slightly upwardly and rearwardly as indicated by the numeral 37 to form hooks. The fingers are curved upwardly to form the rest for a sheaf or straw when it is forced into the pocket formed by the fingers as shown in dotted lines in Figure 2 of the drawing, and rearwardly to prevent the sheaves from adhering to the fingers which would otherwise cause them to be dragged along.

Should an obstruction be met with, such as a stump, post or the like, while the binder is in operation, that would come in contact with the outer end of the attachment, this end is permitted to swing backward on the pivot bolt 21 and when free from the obstruction, the spring 23 will return the same to its normal position.

The lower ends of the fingers extend slightly below the carrier structure B of the harvester and are bowed outwardly from the outer ends of the rod of the platform or carrier B of the harvester.

In use, the attachment is connected to the binder so that the outer arcuate ends of the fingers 25 curve over the outer ends of the bundle carrier B and after the first bundle has been deposited upon the carrier from the deck A it will be forced outwardly by subsequent bundles until it is engaged in the arcuate portions of the fingers 25. These fingers will prevent the bundle from being dropped from the carrier B and will also form an abutment against which other bundles may be forced, upon the depositing of subsequent bundles upon the carrier, permitting the carrier to retain a greater number of bundles thereon, than can be retained with the ordinary carrier. The fingers also prevent the accidental deposit of any bundles from the carrier, thus insuring all of the bundles being deposited in the proper and desired place, which eliminates much unnecessary work in harvest fields, occasioned by the gathering of the straggling bundles from over the surface of the field and carrying them to the desired windrow or shocking position. Furthermore, the fingers 25 will catch and retain loose straw, in case a bundle should be forced upon the carrier before it is properly tied or bound and these loose straws will be deposited, together with the tied bundles at the desired place, and they may be then easily gathered up and tied into bundle formation.

This attachment will very materially aid in holding the straw, in cutting flax, until it is desired to discharge the same. In cutting of flax, sheaves are not made and thus loose straw is often scattered over the field.

When sufficient sheaves have been deposited upon the carrier to exert an outward and upward pressure against the fingers 25, the same will flex or spring outwardly and upwardly forming, as it were, an extension of the carrier. The sheaves thus forced into the pocket so formed by the fingers 25 will be carried by the carrying attachment. The hooks 37 being upwardly bent enables these fingers 25 to carry a much greater load and to carry it more safely while the binder is moving forwardly. These hooks are bent slightly rearwardly, otherwise the sheaves would have a tendency to cling to the hooks and be dragged along therewith.

In Figures 5 and 6 is illustrated a slightly modified form of the attachment adapted to be used in connection with binders having the laterally extending bundle carriers, such as in the McCormick harvester and binder. In this form, the bundle carrier of the harvester is designated by the letter F and includes the usual fingers or tines 50 and the side guards 51 and 52. The attachment, in this form, is constructed exactly like the attachment illustrated in Figures 1 to 4 with the exception that the casting 30 retains rearwardly extending fingers 55 and laterally extending fingers 56, in lieu of the rods 25.

There is always a tendency for sheaves to slip off of the rear end of this type of carrier particularly in going up hill and over rough ground. Often when it is desired to carry a few extra sheaves to the windrows some of them are forced over the outer end of the platform. The accidental discharge of the sheaves over the outer end of the carrier is prevented by means of the fingers 55 which curve arcuately and are provided with downwardly bent terminals 57 which engage over the side members 52 of the carrier. The ends 57 act as an abutment and prevent the swinging back of the fingers. The lower ends of these arms are also bent rearwardly, the object of which is to prevent the sheaves being carried along when the platform is tilted or dumped.

The fingers 56 are curved arcuately and downwardly and laterally of the carrier, and they form a basket in connection with the carrier and prevent the sheaves which have been tied or the loose straw in case of cutting flax or the like from being accidentally discharged. The carrier can be tilted downwardly by the operator when it is desired to discharge the sheaves and the fingers 56 will not interfere with the discharge and will tend to guide the same and prevent them from slipping and falling off from the outer end of the carrier.

The attachment can be adjusted so that it may be used with any type or make of binder or bundle carrier now on the market, and the fingers can be so shaped that they will answer the purposes intended.

When long grain is encountered, the knotter is drawn rearwardly to tie the sheaves in the center. The attachment is then attached to the knotter frame and is moved at the same time, thus automatically adjusting itself to the condition of the grain.

From the foregoing description, it can be seen that an exceptionally simple and effective attachment has been provided for grain harvesters and binders, which will effectively prevent the accidental discharge of bundles from the bundle carrier and permit a much larger load to be carried thereby.

Changes in details may be made without departing from the spirit or scope of this invention; but, Having fully described the invention what is claimed is:

1. The combination with an ordinary self-binding harvester including a bundle carrier, of an attachment for the harvester comprising a pivotally mounted bar, means for maintaining said bar in position, a plurality of fingers carried by the outer end of said bar and radiating from a common center, said fingers having their outer portions curving outwardly and downwardly and positioned outwardly of the outer end of the bundle carrier for engaging the outermost bundles carried by the bundle carrier to prevent the accidental discharge of the bundles from the carrier.

2. The combination with an ordinary self-binding harvester including a bundle carrier, of an attachment for the harvester comprising a pivotally mounted bar, means for yieldably maintaining said bar in position, a plurality of fingers carried by the outer end of said bar and radiating from a common center, said fingers having their outer portions curving outwardly and downwardly and positioned outwardly of the outer end of the bundle carrier for engaging the outermost bundles carried by the bundle carrier to prevent the accidental discharge of the bundles from the carrier, said first named fingers having their lower ends curved upwardly and rearwardly to form hooklike portions.

3. In an attachment for self-binding harvesters, the combination of an attaching bar, a carrying bar pivotally connected to said attaching bar, a casting adjustably carried by the outer end of said carrying bar, a plurality of fingers supported by said casting and the outer end of said carrying bar, said fingers having their outer portions arcuate and curving downwardly and inwardly towards the inner end of the carrying bar.

4. In an attachment for self-binding harvesters, the combination of an attaching bar, a carrying bar pivotally connected to said attaching bar, a casting adjustably carried by the outer end of said carrying bar, a plurality of fingers supported by said casting and the outer end of said carrying bar, said fingers having their outer portions arcuate and curving downwardly and inwardly towards the inner end of the carrying bar, means for holding said bars out of alignment and yieldable means for moving said carrying bar in engagement with said holding means.

5. In an attachment for self-binding harvesters, the combination, of an attaching bar, a carrying bar pivotally connected to said attaching bar, a casting adjustably carried by the outer end of said carrying bar, a plurality of fingers supported by said casting and the outer end of said carrying bar, said fingers having their outer portions arcuate and curving downwardly and inwardly towards the inner end of the carrying bar, a bracket carried by said attaching bar and adapted for engagement with said carrying bar to hold the carrying bar in adjusted angular position with respect to the attaching bar, and yieldable means for moving said carrying bar in engagement with said bracket.

6. In an attachment for self binding harvesters, the combination of an attaching bar, including an inner section, an outer section, means hingedly connecting the sections together, a rest bar carried by the inner section for engagement with the lower surface of the outer section, a carrying bar pivotally connected to the outer section, a plurality of fingers carried by the outer end of the carrying bar, an angle bracket carried by the outer section, a bracket carried by the carrying bar, spring means connecting the brackets together, and a foot formed on the second bracket arranged to engage the rest bar.

7. The combination with a carrier, of an attachment comprising a bar including an inner section and an outer section, means hingedly connecting the outer section to the inner section, a bar pivoted to the outer section, and arcuate fingers carried by the last mentioned bar.

8. In an attachment for self binding harvesters, the combination with a sheaf carrier, of an attachment comprising a bar including an inner section and an outer section, means hingedly connecting the outer section to the inner section, locking means holding the outer section against movement in relation to the inner section, a bar pivotally carried by the outer section, and a plurality of arcuate fingers carried by the bar and arranged to project toward the carrier.

9. The combination with a sheaf carrier, of an attachment comprising a bar including an outer section, an inner section, means hingedly connecting the outer section to the inner section, a rest bar carried by the inner section and arranged to support the outer section, a carrying bar pivotally connected to the outer section, a stationary angle bracket secured to the outer section arranged to engage one end of the carrying bar, a second angle bracket secured to the carrying bar, spring means connecting the angle brackets together, a foot formed on the second mentioned angle bracket arranged to engage the rest bar, a plurality of arcuate fingers carried by the carrying bar and arranged to project downwardly toward said carrier.

10. The combination with a sheaf carrier, of an attachment comprising a bar including an inner and outer section, means hingedly connecting the outer section to the inner section, means rigidly securing the inner section above and at one side of the carrier, a carrying bar pivotally carried by the outer section and arranged to project outwardly at an angle therefrom, spring means holding the carrying bar in operative position in relation to the outer section, a head carried by the carrying bar, a plurality of arcuate fingers carried by the head and arranged to project down toward carrier, and means for adjusting the position of said head.

11. The combination with a sheaf carrier, of an attachment comprising a pivotally mounted bar, of a carrier arranged below the bar, a plurality of resilient fingers carried by the bar provided with offset ends, which co-act with the ends of the carriers, said offset ends of the fingers being bent upwardly to prevent sheaves dropping therefrom and slightly rearwardly to prevent the sheaves from being carried along after the carrier is dumped.

PAUL GERLACH.